(12) United States Patent
Hou

(10) Patent No.: US 6,596,979 B2
(45) Date of Patent: Jul. 22, 2003

(54) METHOD AND APPARATUS FOR SCANNING COLORS USING MULTIPLE ARRAYS OF PHOTODETECTORS

(75) Inventor: Alpha Hou, San Jose, CA (US)

(73) Assignees: Syscan Technology (Shenzhen) Co., Limited, Shenzhen (CN); Syscan, Inc., San Jose, CA (US)

( * ) Notice: Subject to any disclaimer, the term of this patent is extended or adjusted under 35 U.S.C. 154(b) by 0 days.

(21) Appl. No.: 10/028,812

(22) Filed: Dec. 21, 2001

(65) Prior Publication Data
US 2002/0113196 A1 Aug. 22, 2002

Related U.S. Application Data

(63) Continuation-in-part of application No. 09/789,299, filed on Feb. 20, 2001.
(51) Int. Cl.[7] .................................. H01J 40/14
(52) U.S. Cl. .................... 250/208.1; 250/234; 250/226; 358/443
(58) Field of Search ............................. 250/208.1, 234, 250/235, 226; 358/443, 450, 496, 497, 498, 514; 348/262, 263

(56) References Cited

U.S. PATENT DOCUMENTS 5,750,985 A * 5/1998 Suzuki ..................... 250/234

* cited by examiner

*Primary Examiner*—Kevin Pyo
(74) *Attorney, Agent, or Firm*—Joe Zheng

(57) ABSTRACT

An image sensor employing multiple arrays of photodetectors is disclosed. According to one aspect of the present invention, every two of three arrays are shielded with a non-transparent material. When charge signals are generated in the non-shielded array in response to light reflected from a scanning document illuminated by one of three colored lights, the charge signals are shifted to a next adjacent shielded array so that another set of charge signals can be generated under another one of the three colored lights. Essentially, the shielded arrays are used as buffers to separate the charge signals independently generated under three different colored lights. Subsequently, the charge signals corresponding to the same colored light can be accumulated to produce a much stronger scanning signal.

21 Claims, 11 Drawing Sheets

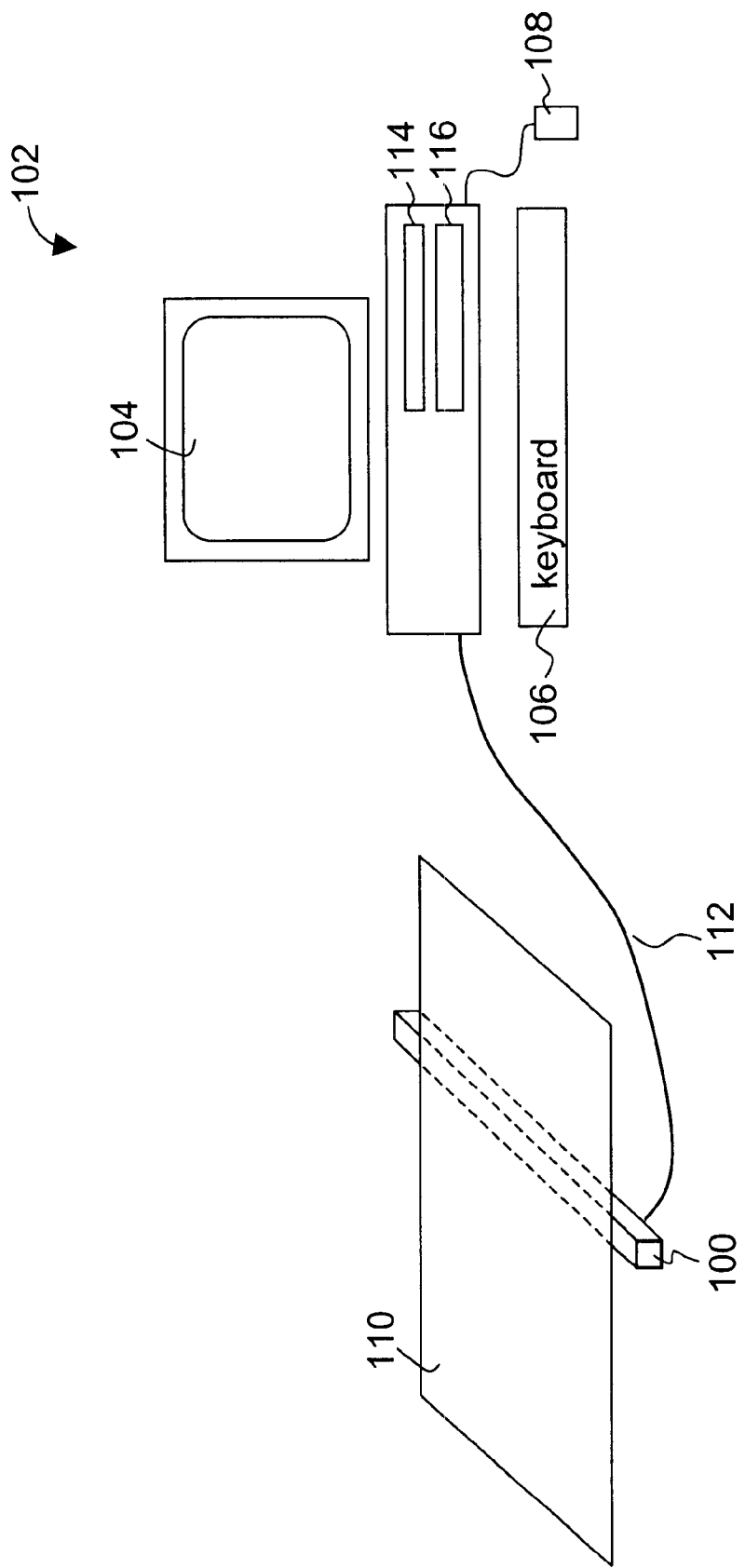

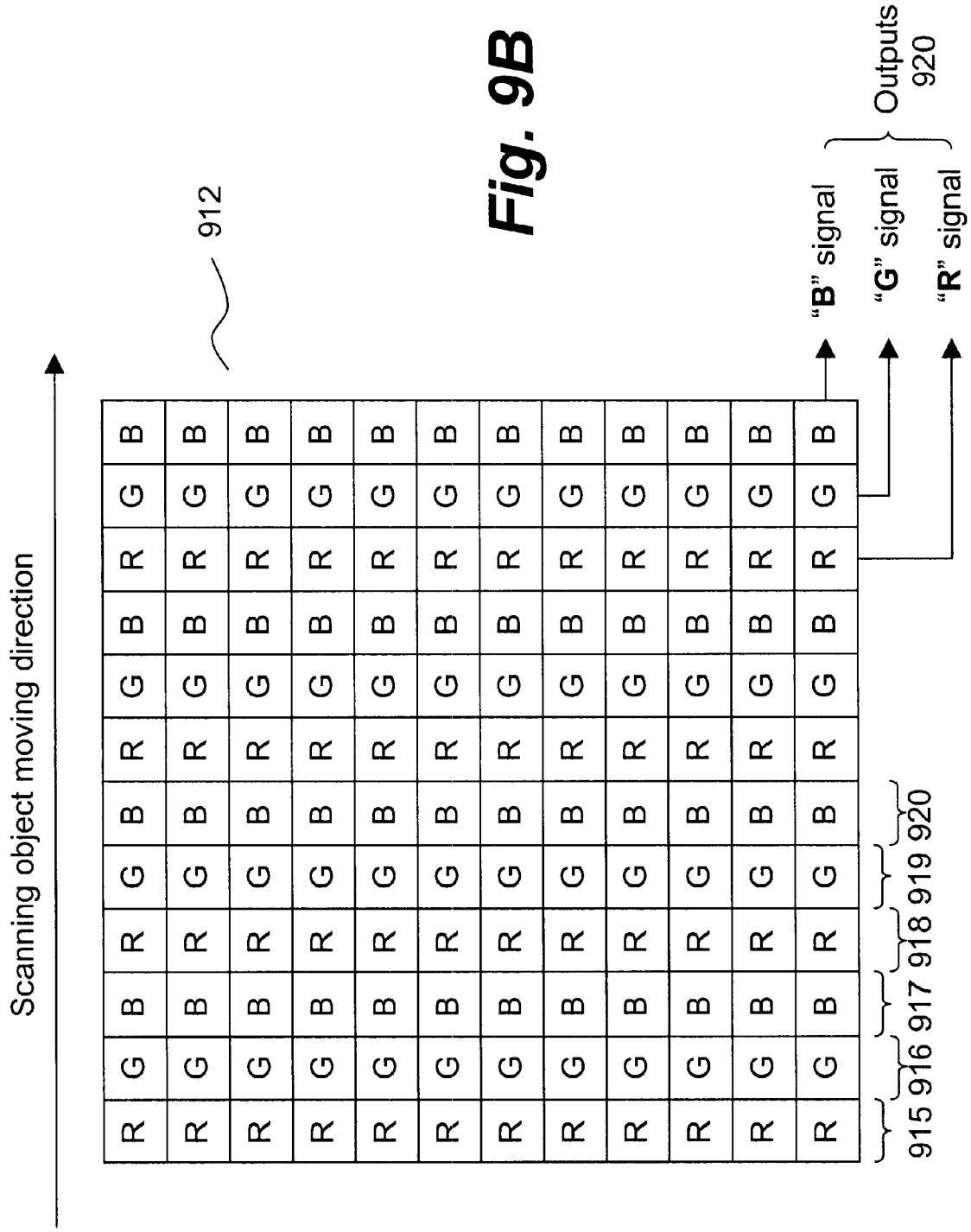

METHOD AND APPARATUS FOR SCANNING COLORS USING MULTIPLE ARRAYS OF PHOTODETECTORS

CROSS-REFERENCE TO RELATED APPLICATION

This is a continuation-in-part of co-pending U.S. application Ser. No. 09/789,299, entitled "Motion synchronized two-dimensional linear image sensor array", filed Feb. 20, 2001, commonly assigned, by Alpha Hou.

BACKGROUND OF THE INVENTION

1. Field of the Invention

The present invention generally relates to color document scanning systems and more particularly relates to a full width image sensor comprising multiple arrays of photodetectors laid out along the moving direction of a document, wherein the multiple arrays of photodetectors are sequentially exposed to the document to produce scanning signals of high fidelity and strength.

2. Description of the Related Art

There are many applications that need optical scanners to convert paper-based objects, such as texts and graphics, to an electronic format that can be subsequently analyzed, distributed and archived. One of the most popular optical scanners is flatbed scanners that convert scanning objects, including pictures and papers, to images that can be used, for example, for building World Wide Web pages and optical character recognition. Another popular optical scanner is what is called sheet-fed scanners that are small and unobtrusive enough to sit between a keyboard and a computer monitor, or can be integrated into a keyboard or a PDA to provide a handy scanning means. Most optical scanners are referred to as image scanners as the output thereof is generally in digital image format.

Structurally, an optical scanner generally comprises a photo-sensing module that converts a document image optically into its corresponding electronic signal. Typically, a photo-sensing module comprises an illumination system, an optical system, an image sensor and an output circuit. The illumination system is used to illuminate the document image being scanned. The optical system is used to direct and focus the image light reflected from the document image onto the image sensor. Physically, the image sensor comprises a plurality of photodiodes, photo-transistors or Charge Coupled Devices (CCD), referred to as photodetectors hereafter, that are sensitive to an incident light and produces an electronic signal, called the pixel or charge signal of each photodetector. Generally, the pixel signal is proportional to the intensity of the incident light, and the brighter the incident light is, the stronger the pixel signal will be. The output circuit is used to amplify if necessary and convert these pixel signals into an appropriate digital image format for further processing.

The image sensor and its associated signal processing circuitry are generally fabricated with Complementary Metal-Oxide Semiconductor (CMOS) or CCD semiconductor wafer processing technology and configured in either a one-dimensional or two-dimensional array. Those one-dimensional arrays are typically employed in the optical scanners including photocopy and facsimile machines while the two-dimensional arrays are typically used in instant image capturing devices (i.e. digital cameras and camcorders).

The operation of an image sensor comprises two processes, the first being the light integration process and the second being the signal readout process. During the light integration process, each photodetector captures the incident photons of the reflected light from a document that is being imaged or scanned and converts the total number of the incident photons into a proportional amount of an electronic charge or an equivalent pixel signal. At the end of the light integration process, the photodetector is masked so that no further photons would be captured. Next, the photodetector starts the signal readout process during which the pixel signal in the subject photodetector element is read out, via a readout circuit, to a data bus or video bus.

To save cost, many flatbed and sheet-fed scanners employ an image sensor of one-dimensional array. As the document image to be scanned is two-dimensional, relative and line-by-line movement between the document and the image sensor with concurrent image capturing by the image sensor is required in order to capture an image of the complete document. Additionally, in the case of scanners that are capable of capturing the information off a color document, there are generally three sets of distinctly different component color information to be captured for a color image.

In addition to the need of a high degree of fidelity of the captured image, another important requirement of an image scanner is its speed, or scanning throughput. This is the time it takes for a scanner to scan an entire document page. The shorter the capture time is, the more productive the scanner is, hence the more desirable it is to users.

It is generally understood that the word "line" within the context of "line-by-line movement" refers to a pixel line, a scanning line position or simply a scanning line corresponding to the resolution of the scanner which is typically expressed in terms of lines, pixels, or per inch. Naturally, the higher the resolution of the scanner is, the better the fidelity of the captured image will be. For a typical image scanner, a minimum resolution of 300 Pixels Per Inch (PPI) is expected with 600 PPI demanded in many cases. Thus, to scan a typical page of 8.5"×11" letter sized document at a resolution of 300 PPI the following total number of scanning lines must be imaged:

11 inch×300 lines/inch=3300 lines.

In a typical photocopy (Xerox) machine, scanning these lines is just a matter of seconds because the photocopy machine can provide a very strong illumination source so that the integration time for photodetectors is very short. Given the fact that the integration time is typically long for the photodetectors in a small optical scanner as the scanner could not provide a strong illumination source, having to scan such a large number of scanning lines per page would take a noticeably long time.

Therefore, it is desirable for an image sensor that, when employed in a scanner, could provide a high scanning speed without requiring additional stronger illumination.

SUMMARY OF THE INVENTION

The present invention has particular applications to scanners such as desktop, sheet-fed scanners and facsimile machines. According to one aspect of the present invention, an image sensor employing multiple arrays of photodetectors is disclosed. According to one aspect of the present invention, every two of three arrays are shielded with a non-transparent material. When charge signals are generated in the non-shielded array in response to light reflected from a scanning document illuminated by one of three colored lights, the charge signals are shifted to a next adjacent shielded array so that another set of charge signals can be generated under another one of the three colored lights. Essentially, the shielded arrays are used as buffers to separate the charge signals independently generated under three different colored lights. Subsequently, the charge signals corresponding to the same colored light can be accumulated to produce a much stronger scanning signal.

The image sensor can be advantageously used in a portable scanner for scanning a document. Typically, a portable scanner is equipped with a low illumination source. With the image sensor of the current invention, the scanning throughput can be substantially increased and at the same time, the image quality is of great improvement.

Accordingly, it is an object of the present invention to provide an image sensor that output scanning signals of high fidelity and low noises.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 1 is a schematic illustration of a scanner application;

FIG. 9B shows an alternative embodiment of FIG. 9A and could be used to produce color images in higher resolution.

DETAILED DESCRIPTION OF THE INVENTION

Figure 2A:
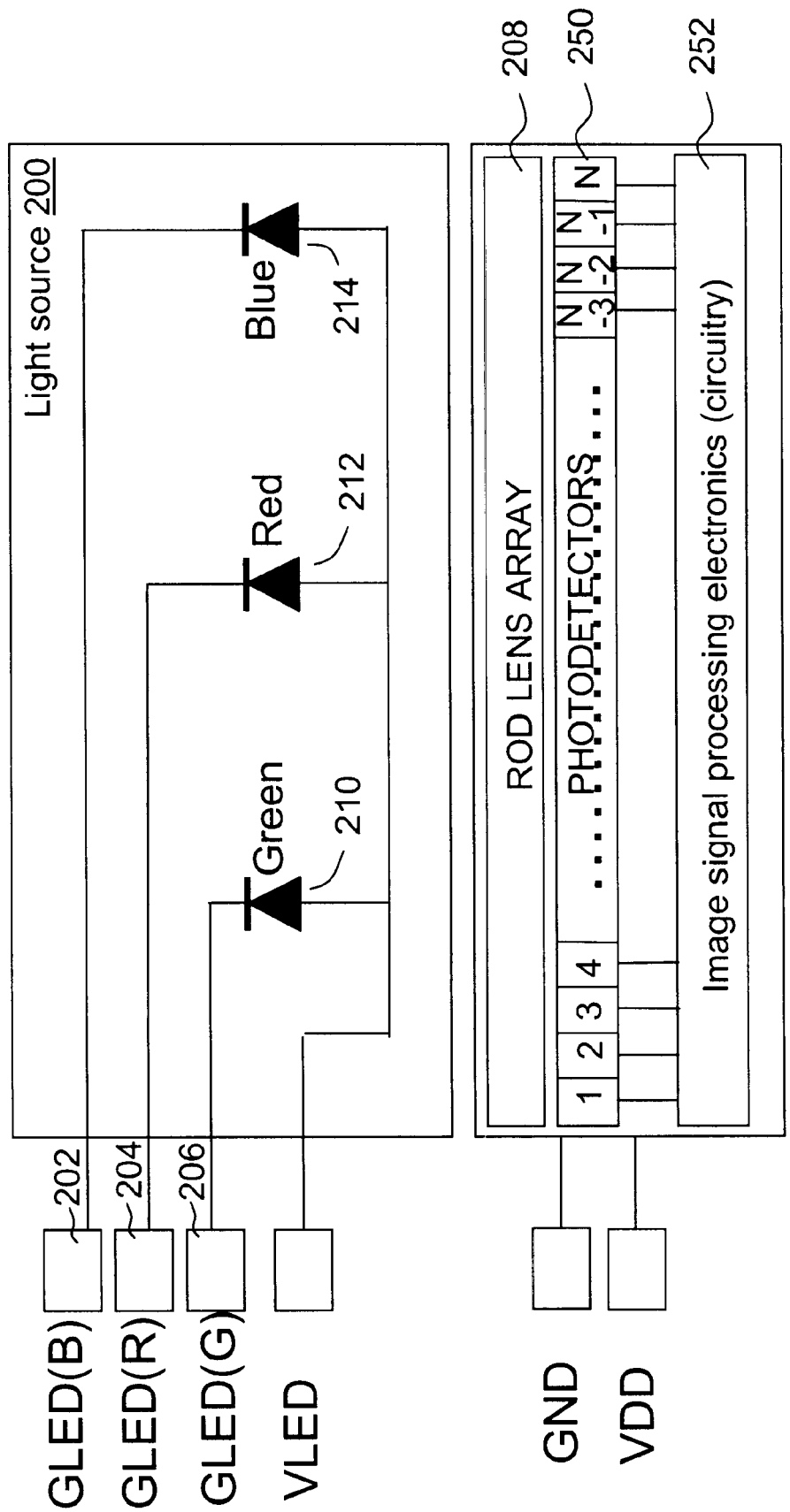
FIG. 2A shows an internal functional block diagram of an image sensing module inside an image scanner.

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. The detailed description is presented largely in terms of procedures, logic blocks, processing, and other symbolic representations that directly or indirectly resemble the operations of data processing devices coupled to networks. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Referring now to the drawings, in which like numerals refer to like parts throughout the drawings. FIG. 1 shows an exemplary schematic diagram embodying the application of an image scanner. A scanner 100 is connected, through a communication cable 112, to a computing device 102 which may be an IBM PC or PC-compatible computer operating under a graphics operating system, for example, the Microsoft Windows 2000.

The scanner 100 scans a scanning document 110, such as a paper with text or graphics image printed thereon. The scanning result, which is generally a captured digital image, is transferred to the computing device 102 through the communication cable 112. The captured digital image may be manipulated for a variety of desired visual effects by a computer program. Subsequently, the scanned or manipulated image can be displayed on a display monitor 104.

The computing device 102 is provided with a display monitor 104 on which a user can display the scanned or manipulated image for viewing. The computing device 102 is further provided with a floppy disk drive 114 and a hard disk drive 116 through these all kinds of image files and application program files may be transferred to and from a removable floppy disk media or a fixed hard disk medium. Additionally, the computing device 102 has a keyboard 106 for user input of text data such as titles and names for the captured digital image files, and a pointing device 108 such as a mouse or the like for the navigation and execution of commands, for example, to display the scanned and manipulated images on the display monitor 104.

To facilitate the understanding of the present invention, FIG. 2A shows an exemplary internal functional block diagram of an image sensing module employed in a scanner. A light source 200 comprises a red LED 212, a green LED 210 and a blue LED 214, respectively controlled by an "ON" signal at the connectors 204, 206 and 202. It should be noted that light source 200 may be implemented with other single or multiple sources. According to one embodiment, for the capture of the color image of a scanning line of a document, the three LEDs 212, 210 and 214 are turned on respectively and sequentially to illuminate the document. For each color component corresponding to the color of the LED being turned on, the reflected light from the pixel line being scanned gets collected and focused by a rod lens array 208 onto a photodetector array 250 underneath. The photodetector array 250 in turn converts the focused component color image of a scanning or pixel line into a corresponding array of photo electronic signals to be processed by the following signal processing electronics 252 including readout circuitry. The image signal processing electronics 252 reads out, perhaps, amplifies, the photo electronic signals into a stream of captured image data for the component color of the pixel line. Thus, for each pixel line of the document, three (3) lines of captured image data each for a distinct color component is generated.

Figure 2B:
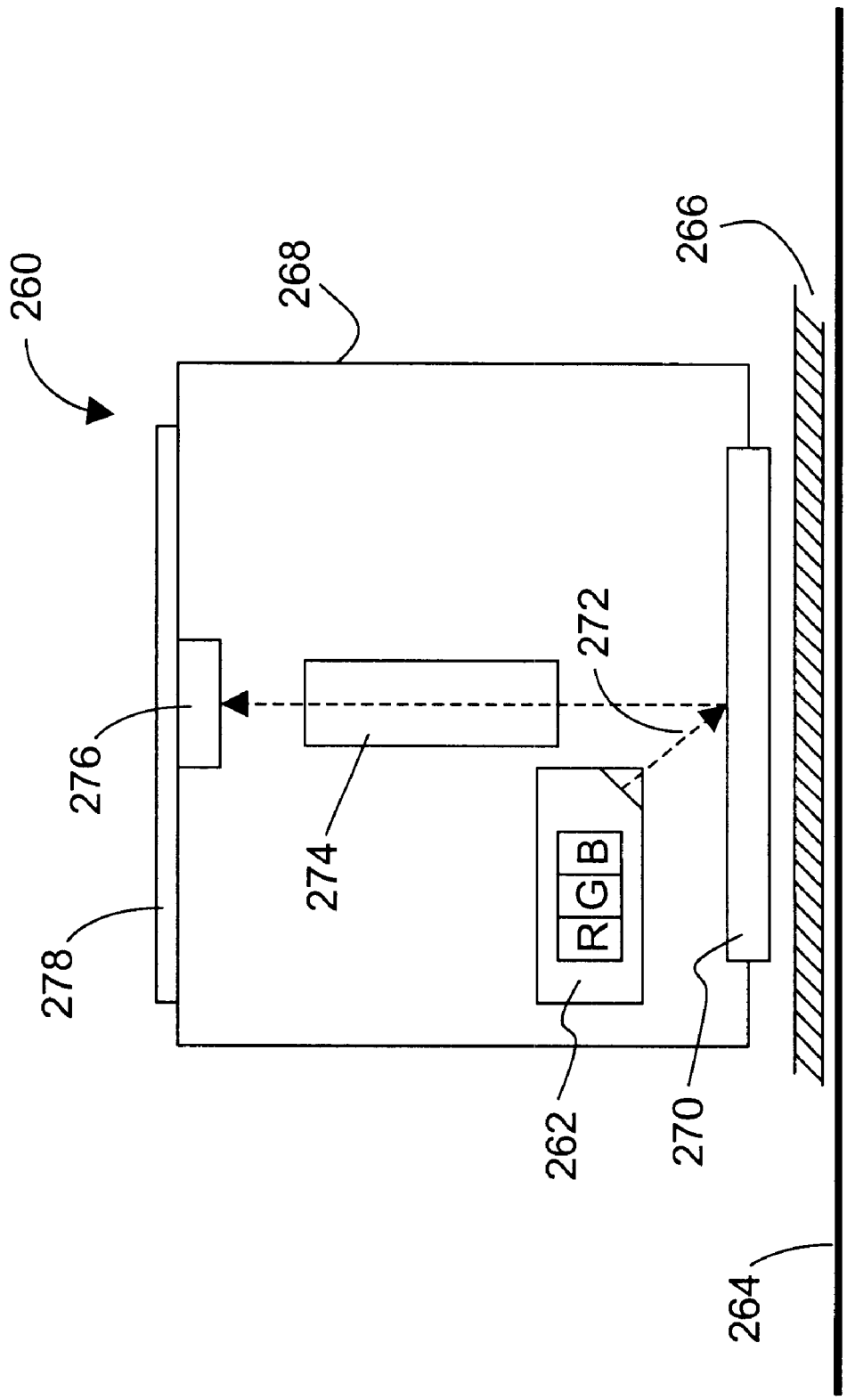
FIG. 2B shows a cross section view of an exemplary image sensing module.

FIG. 2B shows a cross section view of an exemplary image sensing module 260. A color light source 262 provides 3 different illuminations, e.g. red, green, and blue lights, to a scanning object 264 facing up under a transparent panel 266. Typically, the image sensing module 260 is made in a modular tube 268 and the opening 270 to scanning object 264 is preferably protected by the transparent panel 266 (in some cases, the opening 270 is simply the transparent panel 266). When the light source 262 emits light through opening 270 onto scanning object 264 as indicated by 272, the light reflected from scanning object 264 again through opening 270 is directed at optical lens 274. Generally optical lens 274 is an array of erect graded index micro (cylindrical or rod) lens. It should be understood that the present invention is independent of the optical lens and the light source. The use of a particular light source and the lens array in this configuration facilitate the description of the present invention and impose no limitation thereof. Directly above optical lens 274, there is an image sensor 276 comprising an array of photodetectors made of CMOS or CCD sensors. The optical lens 274 collects the reflected light onto the photodetectors that convert the reflected light to electronic signals proportionally representing the intensity of the reflected light. The electronic signals are then transferred to data bus 278 for readout or other operations, for example, in the image signal processing electronics 252 of FIG. 2A.

For the scanning object 264 under the panel 266 to be completely scanned, the image sensing module 260 must have a relative movement over the scanning object 264 to scan the entire scanning object 264. Depending on an exact implementation, either the image sensing module 260 or the scanning object 264 is moved across each other by a moving mechanism (not shown in the figure). The relative moving speed is conformed to the image vertical resolution in the resultant image and hence synchronized by a sensor clock signal that may be generated from an oscillating circuit. These are well known in the art and not to be discussed further herein.

Figure 3:
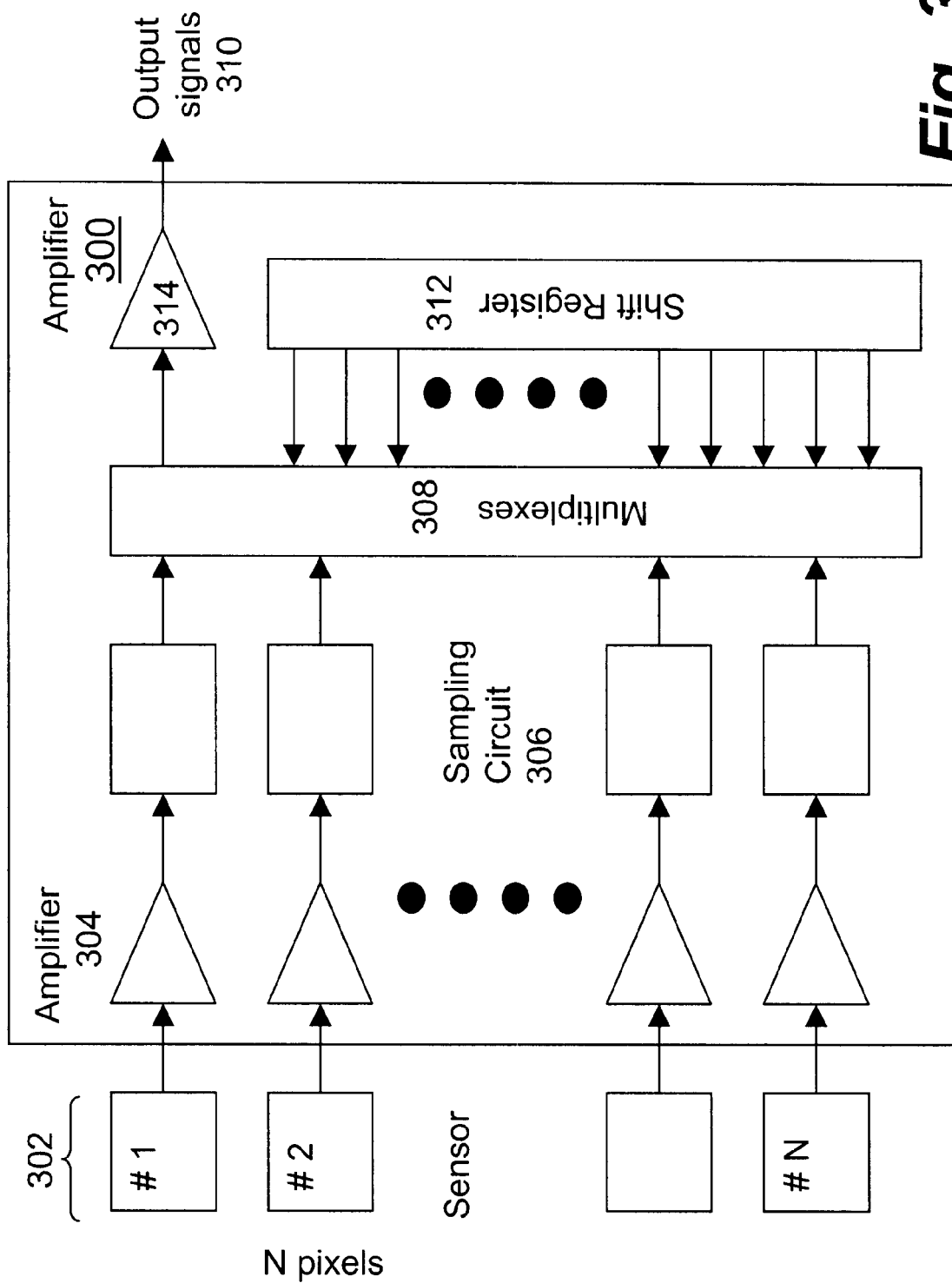
FIG. 3 illustrates an exemplary layout of sensor elements with associated image signal processing electronics.

FIG. 3 illustrates an exemplary layout of sensor elements with associated image signal processing electronics 300. Photodetector array 302 comprises a single row of N photodetectors and each is labeled #1, #2, . . . , #N. During a scanning operation, each of the photodetectors collects image lights cast thereon for an integration period and generates an electronic signal. At the end of the integration period, the electronic signals are amplified in an amplifier array 304 and sampled respectively via a sampling circuit array 306. The amplified and sampled pixel signals are sequentially readout through multiplexers 308 as a final serial image signal output 310, wherein the operation of the multiplexers 308 is controlled by a shift register array 312. Optionally, the output signals are amplified via an amplifier 314.

The continuing demand for higher resolution and higher scanning throughput from an image scanner is confronted with the fundamental lower limit of charge integration time from the physics of photo sensing. That is, for a required level of electronic signal output, the time component of image capturing by the image sensor must not be lower than the corresponding charge integration time. In fact, the demand for higher resolution dictates the use of a smaller photo-detector element that in turn would require an even longer charge integration time while the demand for the higher scanning throughput requires the use of higher-powered illumination.

Figure 4:
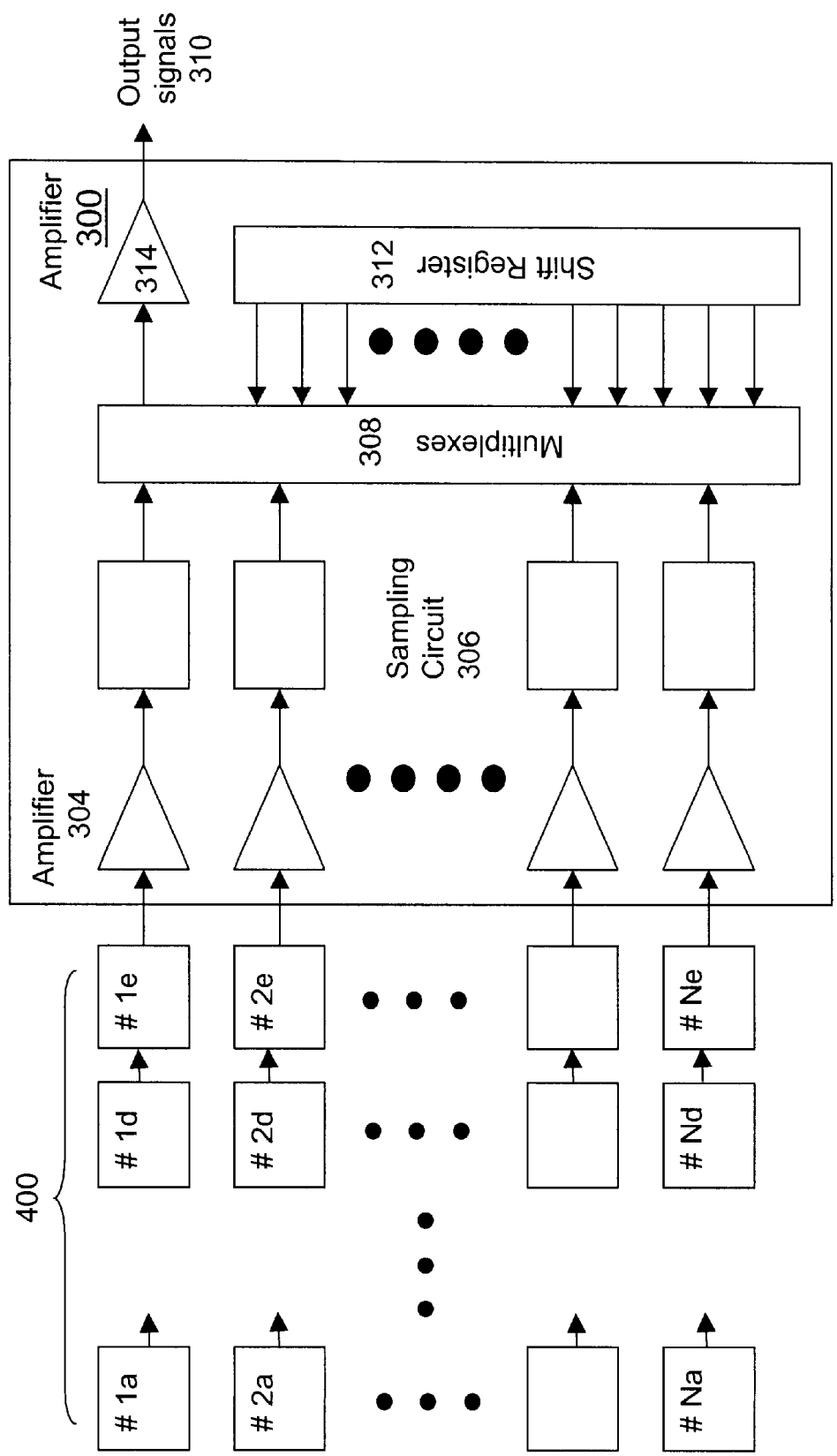
FIG. 4 illustrates an exemplary layout of an image sensor employing multiple arrays of photodetectors according to one embodiment of the present invention.

In consideration of the above demand and its accompanying technical difficulty, an improved image sensor is disclosed herein for the solution with no substantial increase of the cost of the scanner. Reference is made to FIG. 4 that illustrates an exemplary sensor layout 400 according to the present invention. Instead of using a single array of photodetectors, the sensor 400 uses multiple arrays of photodetectors or multiple linear sensors. The number (M) of the arrays is greater than 2 and dependent on an exact implementation. For example, M=5, the photodetectors of the first row, are arranged along the direction of document movement and are labeled 5 rows as #1a, #1b, #1c, #1d and #1e, respectively. For the second row, the photodetectors are similarly arranged and are labeled #2a, #2b, #2c, #2d and #2e, etc. Thus, for the N-th row, the photodetectors are labeled #Na, #Nb, #Nc, #Nd and #Ne. As one of the features in the present invention, multiple arrays of photodetectors are used, instead of single array of photodetectors, at each pixel location along the moving direction of a scanning document. These photodetectors will be simultaneously exposed to the reflected image light (or transmitted light) from the document and their respectively generated photo electronic signals are shifted in series. Each of the shifted signals is added up in a coordinated manner to enhance the quality and fidelity of the captured image for high resolution scanning operation with high scanning throughput.

In operation, along the document moving direction, the center to center distance between adjacent photodetector elements, or equivalently the photodetector pitch, is set to correspond to the scanning resolution. For instance, a 600 DPI scanning resolution means the photodetector pitch is 25.4 mm/600=42.333 micron. In a preferred embodiment, the photodetector is of square, i.e. square pixel.

Figure 5:
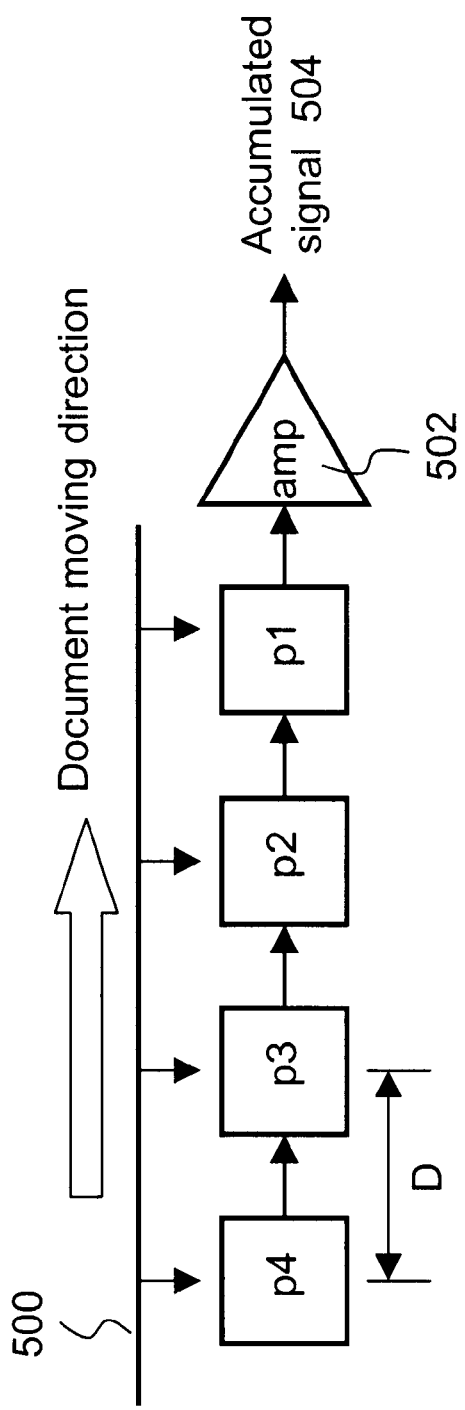
FIG. 5 shows a local view of the first row of sensor elements from the example layout of the present invention with illustration of charge shifting.

Referring now to FIG. 5, there is shown a pictorial diagram of a row of 4 photodetectors p1, p2, p3 and p4, each of the photodetectors is in a different array of photodetectors. According to one embodiment, an image sensor includes M arrays of photodetectors integrated in parallel, each of the arrays includes N photodetectors, hence i-th photodetector in each of the arrays (e.g. p1, p2, p3 and p4 when M=4) are serially connected, where 0<i<N. In reality, depending on a required scanning resolution, N is in a range of a few hundreds to thousands or higher. To facilitate the operation of the present invention, the M arrays of photodetectors are equally and respectively spaced by a distance D, essentially controlled by the scanning resolution.

In FIG. 5, a document 500 is rolling across photodetectors p1, p2, p3 and p4 at a controlled speed. It is assumed that the document is moving from left to right in the figure and hence is exposed to photodetector p4 first. When a scanning line of the document 500 crosses photodetector p4, i.e. at the end of an integration thereof, an electronic signal E4 is generated in photodetector p4 in response to a light reflected from the scanning line (e.g. a scanning spot with respect to one photodetector). When the scanning line of the document 500 is proceeding to photodetector p3, electronic signal E4 is shifted to photodetector p3 first. When the scanning line of the document 500 crosses photodetector p3, an electronic signal E3 is now generated in photodetector p3 in addition to the shifted E4 already stored in photodetector p3. Now the combined E4 and E3 are shifted from photodetector p3 to photodetector p2 before photodetector p2 generates E2 in response to a light reflected from the same scanning line (spot). After the same scanning line (spot) passes photodetector p1, a combined signal E1, E2, E3 and E4 is now available in photodetector p1 and may be amplified in amplifier 502 to yield an accumulated signal 504. It is understood to those skilled in the art that as soon as an electronic signal is shifted from a current photodetector to a next photodetector, the current one is available to generate a new electronic signal to respond to a new incoming scanning spot. Accordingly, the very last photodetector has the accumulated electronic signals from the previous photodetectors. As a result, the signal strength of a scanning signal derived from the accumulated electronic signals is increased in many magnitudes without changing the moving speed of the document. In particular, M=10, the scanning signal could be increased by 10 times. As will be shown below, the signal-to-noise ratio is greatly improved.

According to one embodiment of the present invention, the moving speed of the document is increased by as much as M times. It can be appreciated from the above description that the image sensor produces a signal equivalent to that from an image sensor using only one array of photodetectors. Depending on an actual implementation, a practical adjustment between the desired scanning speed and the desired signal strength will produce an image scanner with higher scanning throughput and much improved scanning signals.

Figure 6:
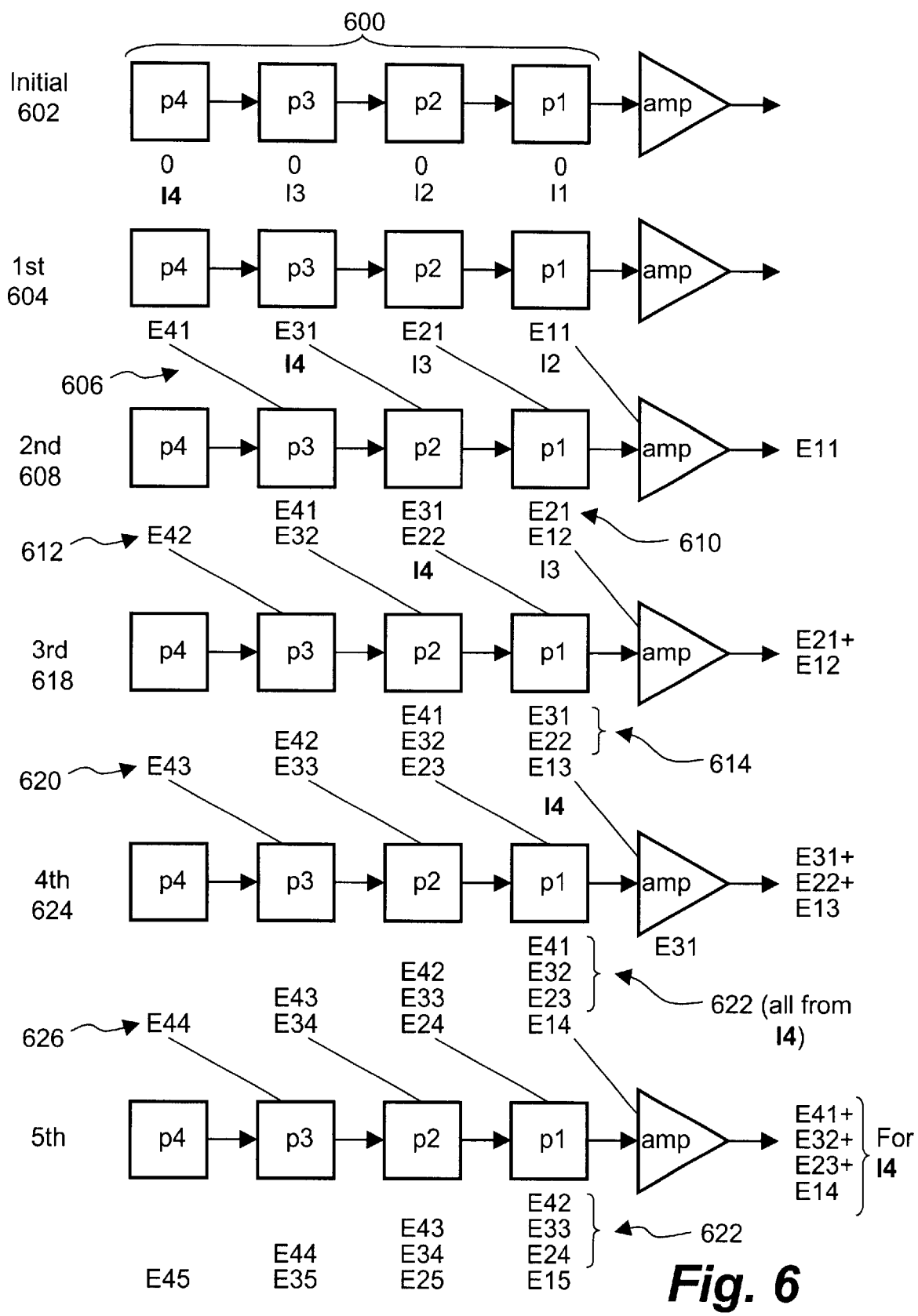
FIG. 6 shows graphically the operations of an image sensor employing four arrays of photodetectors.

FIG. 6 shows graphically the operations of an image sensor 600 employing four arrays of photodetectors. Photodetectors p1, p2, p3 and p4 are i-th photodetector in each of the arrays. When a scanning document (not shown) is proceeding from left to right or the sensor 600 moves from right to left, photodetectors p4, p3, p2 and p1 are sequentially exposed to the document. Initially, photodetectors p4, p3, p2 and p1 are reset and each stores no electronic signals. After a first relative movement 604 between the image sensor and the document, an electronic signal is generated in each of photodetectors p4, p3, p2 and p1 and designated as E41, E31, E21 and E11 respectively, corresponding to image lights (signals) I1, I2, I3 and I4. E41, E31, and E21 are then serially shifted to a next adjacent photodetector while E11 is output through an amplifier. Now the electronic signals are distributed as 610.

After a second relative movement 608 between the image sensor and the document, an electronic signal is generated in each of photodetectors p4, p3, p2 and p1 and designated as E42, E32, E22 and E12 respectively as 612. In this case, E42 is generated by I1, E32 is generated by I2, E22 is generated by I3 and E12 is generated by I4. Again, the charge in each of the photodetectors is shifted to the next adjacent photodetector. The electronic signals are distributed as 614 as a result of the shift and the output is now E21+E12.

After a third relative movement 618 between the image sensor and the document, an electronic signal is generated in each of photodetectors p4, p3, p2 and p1 and designated as E43, E33, E23 and E13 respectively as 620. Once again, the charge in each of the photodetectors is shifted to the next adjacent photodetector. The electronic signals are distributed as 622 as a result of the shift and the output is now E31+E22+E13.

After a fourth relative movement 624 between the image sensor and the document, an electronic signal is generated in each of photodetectors p4, p3, p2 and p1 and designated as E44, E34, E24 and E14 respectively as 626. Once again, the charge in each of the photodetectors is shifted to the next adjacent photodetector. The electronic signals are distributed as 622 as a result of the shift and the output is now E41+E32+E23+E14 which is originally from photodetector p1 before this relative movement 624.

Figure 7:
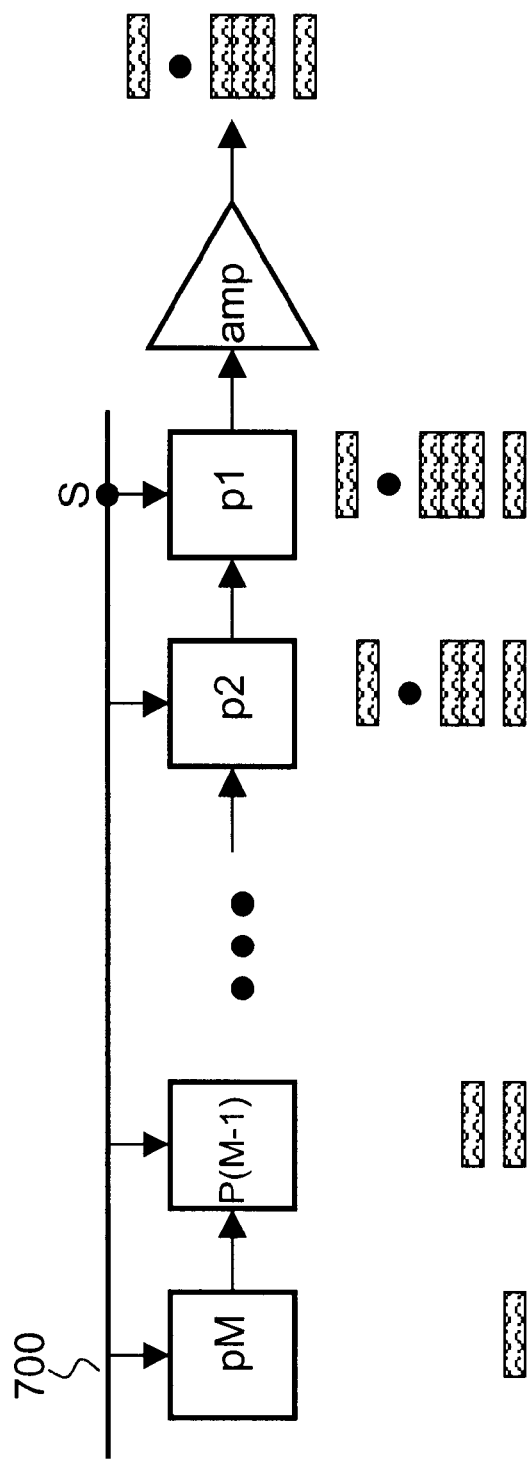
FIG. 7 illustrates the effectiveness of using M arrays of photodetectors.

It can be appreciated from the signals shifted as 626, the output of the image sensor 600 is now increased by 4 times since the relative movement between the image sensor and the document is synchronized to ensure that the same scanning spot is sequentially sensed by p4, p3, p2 and p1. FIG. 7 illustrates the effectiveness of using M arrays of photodetectors. As a document 700 moves from left to right, a scanning spot S is exposed to photodetector pM for a light integration process thereof for a short period (e.g. 10 ms) which generates a charge signal. The charge signal is shifted to photodetector p(M−1) before spot S is exposed to photodetector p(M−1) for a light integration process thereof. As shown in the figure, photodetector p(M−1) has already stored the charge signal shifted from photodetector pM, hence photodetector p(M−1) charges from the shifted charge signal and hence results in a new charge signal twice as much as the charge signal in photodetector pM. As the spot S moves past the last photodetector p1, the accumulated charge in p1 produces a scanning signal that has been increased by the number of photodetectors that the spot S has passed.

Figure 8:
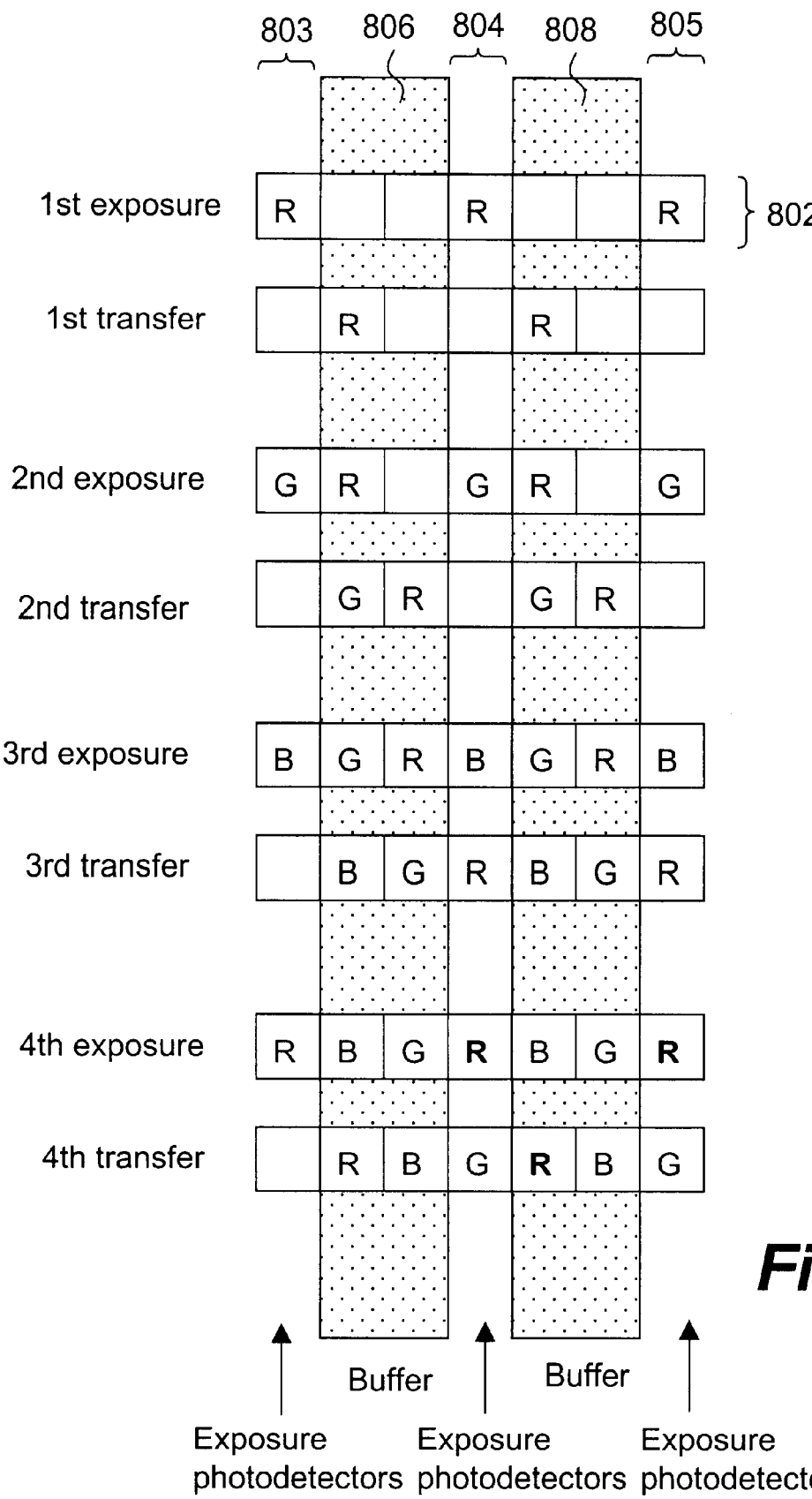
FIG. 8 shows one embodiment of using multiple arrays of photodetectors to generate signals of color scanning objects.

It is well known that traditionally there are three basic color components used to reproduce a color, for example, Red, Green and Blue. In other words, the reproduction of a color needs three individual intensity signals generated respectively. FIG. 8 shows one embodiment of using multiple arrays of photodetectors to generate signals of color scanning objects. An exemplary row 802 shows 6 photodetectors sequentially coupled to each other with 2 pairs of two photodetectors being shielded or masked with a non-transparent trip 806 and 808. In other words, an image sensor contemplated in the present invention employs M arrays of photodetectors, two of every 3 arrays are shielded to prevent from being exposed.

To facilitate the description of this embodiment, it is assumed that three colored lights, red, green and blue are used. In operation, when a scanning object comes across the image sensor, photodetectors 803 and 804 and 805 generate respectively a "red" charge signal R as the $1^{st}$ exposure. The "red" signal corresponds to the fact that a red light source is on when it is generated. Before a green light is one, the generated charge signal R is shifted to the next photodetector as the 1st transfer. When the green light is on, a "green" charge signal is respectively generated in photodetectors 803 and 804 and 805 as the 2nd exposure. Again, in the 2nd transfer, the generated charge signals in photodetectors 803 and 804 and 805 are shifted into the neighboring respective shielded photodetectors and at the same time, the charges originally in the shielded photodetectors are further shifted to the next shielded photodetectors. The same process is repeated for the blue light as the 3rd exposure and the 3rd transfer. However, in the 3rd transfer, the buffered "red" signals are now shifted out from the shielded photodetectors into photodetectors that are to generate new charge signals.

After the above three exposures, the scanning object moves in a synchronized manner (e.g. from left to right according to FIG. 8). Accordingly in the 4th exposure, the "red" signals in photodetectors 804 and 805 are twice stronger as the newly generated charge signals are now accumulated over the earlier charge signals shifted just out from the shielded photodetectors. In the 4th transfer, the accumulated "red" charge signals are now shifted into the next photodetectors in the shield 808 and at the same time the buffered "green" signals are now shifted out of the shield 806 to be accumulated when the next exposure starts.

As a result of using the shields, the principles of the present invention can be readily used in scanning color objects and the scanning signals generated are strong and the requirements for the lighting conditions are low. It should be noted that the shields or the shielded photodetectors can be implemented in many ways given the description herein. In one embodiment, the shielded "photodetectors" are in fact pixel buffers, taking a charge signal from the preceding unshielded photodetector. In another embodiment, an image sensor using multiple arrays of photodetectors can be actually masked with a process that creates a non-transparent film to be superimposed on predefined arrays of photodetectors.

Figure 9A:
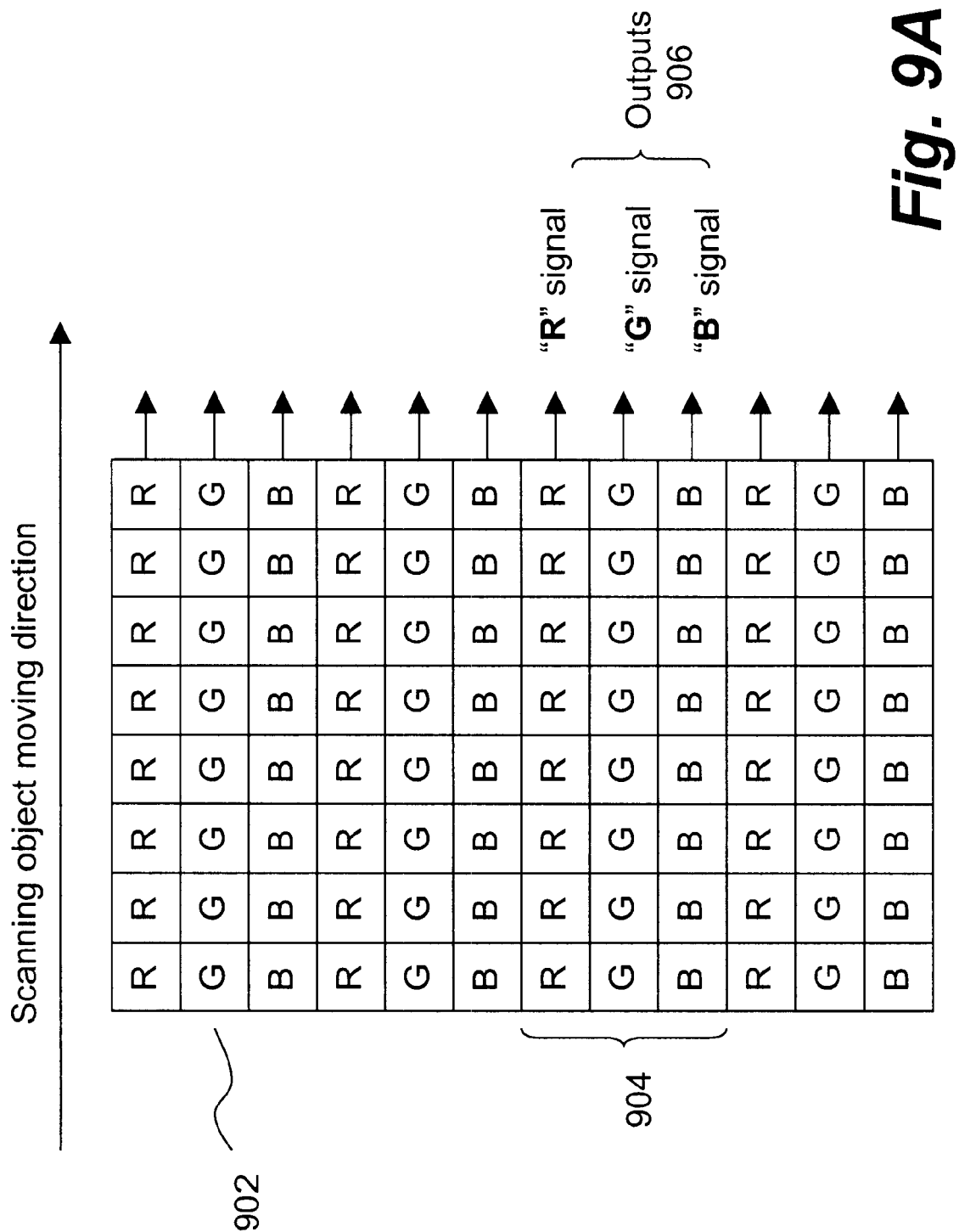
FIG. 9A shows an image sensor using arrays of photodetectors superimposed with corresponding red, green, and blue color filters or other three color filters.

Referring now to FIG. 9A, there is shown an image sensor 902 using arrays of photodetectors superimposed with corresponding red, green, and blue color filters or other three color filters. Accordingly, a single light (e.g. a white) can be used. As a scanning object is moving across the image sensor 902, a group of R, G, B photodetectors (e.g. 904) are exposed to a same scanning point at the same time and generate three charge signals therefor. The three charge signals for that point are then shifted to the next group of R, G, B photodetectors for being accumulated with newly generated charge signals by the next group of R, G, B. As the scanning object is moved in synchronization with the operation of the image sensor 902, the subsequent output signals 906 from the respective R, G, B photodetectors in the last array will be M times stronger, wherein M=8 in FIG. 9A.

FIG. 9B shows an alternative embodiment of FIG. 9A and could be used to produce color images in higher resolution. The image sensor 912 employs multiple arrays of photodetectors, every other two arrays, there is an array of R photodetectors, G photodetectors or B photodetectors. The R, G or B photodetectors in a row are serially connected. As a result of this configuration, the scanning object moves in a way that every time it skips a distance equivalent to the distance of two photodetectors. In other words, a scanning point is simultaneously exposed to an array of R photodetectors 915 an array of C photodetectors 916 and an array of G photodetectors 917. The scanning object is moved in a step mode, namely the scanning point by R photodetectors 915 will fall on R photodetectors 918 so that R photodetectors 918, C photodetectors 919 and B photodetectors 920 scan generate respective charge signals that are then accumulated over the early generated charge signals from R photodetectors 915, G photodetectors 916 and B photodetectors 917. The Sensing process is repeated till the accumulated signals 920 are finally shifted out.

Figure 10:
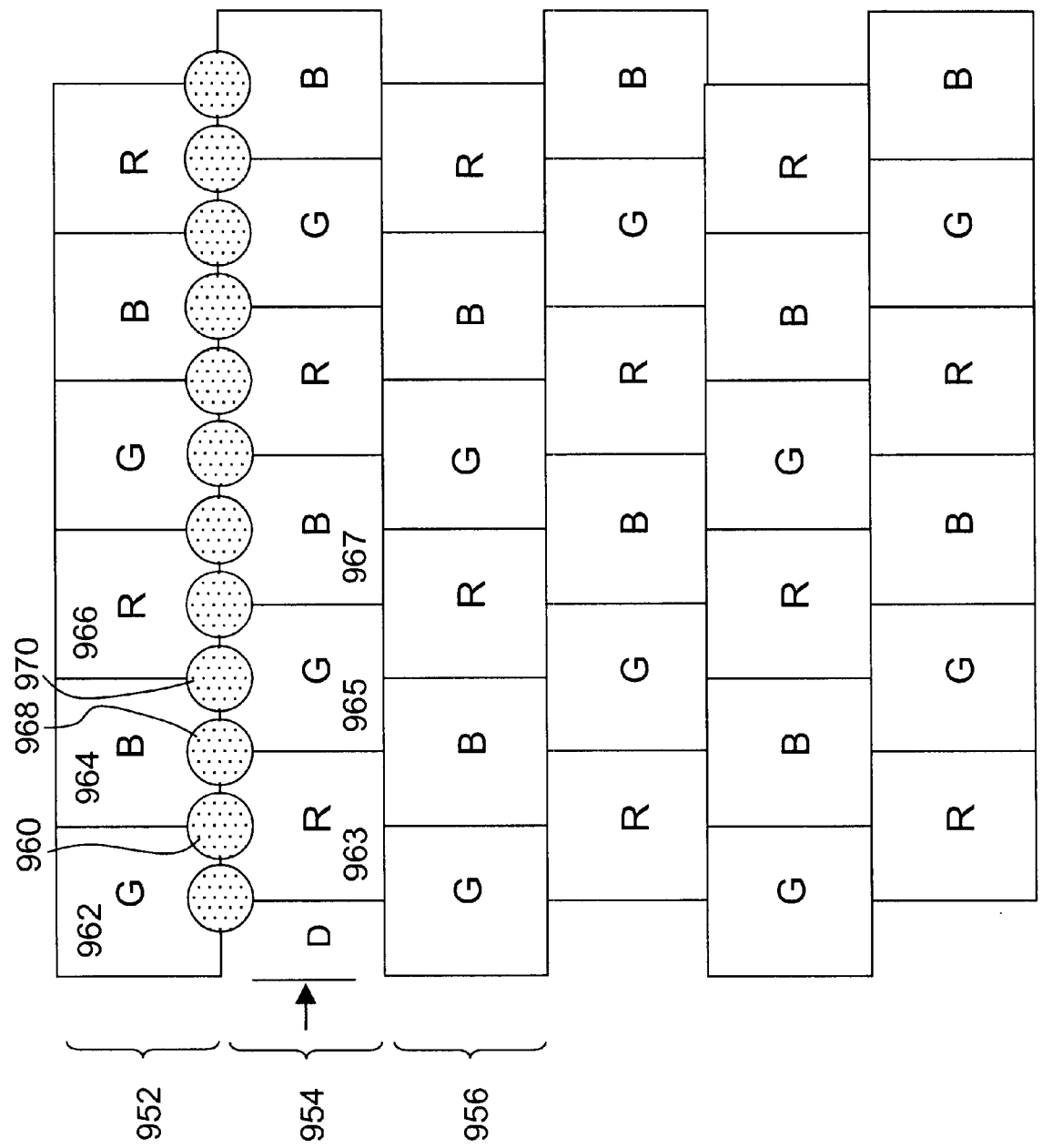
FIG. 10 shows another embodiment employing multiple arrays of photodetectors that are positioned in a staggering manner.

FIG. 10 shows still another embodiment 950 employing multiple arrays of photodetectors. To facilitate the description of the image sensor 950, it is believed that it is easy to perceive the sensor that includes the photodetectors in a row. Although each array, as is shown in the figure, now includes photodetectors that are positioned in a staggering manner, it is also valid to say that the sensor comprises a number of rows that are shifted alternatively by a distance (D). In general, D is preferably a half size of a photodetector. For example, row 952 is shifted by D with respect to row 954. Each row includes all three colored photodetectors (which means that a color filter is superimposed upon a photodetector) and the same colored photodetectors are serially connected. To be more specific, all photodetectors for Red, Green and Blue are respectively and serially connecting in a row. Further the arrangement of rows of photodetectors is made in such manner that at any exposure, three colored photodetectors will be exposed.

To describe the operation of the image sensor 950, it is assumed that a scanning dot 960 (e.g. a spot on the scanning) is being exposed, because of the unique arrangement, each of the photodetectors 962, 963 and 964 generates a respective charge signal. When the scanning dot moves to a new position 968 for being exposed, each of the photodetectors 963, 964 and 965 generates a respective charge signal. When the scanning dot moves to yet another new position 970 for being exposed, each of the photodotectors 964, 965 and 966 generates a respective charge signal. It should be noted that scanning dot 960, 968, and 970 are for illustration only. in reality, the scanning dot 960 corresponds to a group of photodetectors 962, 963 and 964, while scanning dot 968 corresponds to a group of photodetectors 963, 964 and 965 and scanning dot 970 corresponds to a group of photodetectors 964, 965 and 966.

By logic, as the scanning object moves along, it can be observed that, at the end, signals in all the red photodetectors are accumulated to produce a strong accumulated red signal $S_R$, signals in all the green photodetectors are accumulated to produce a strong accumulated green signal $S_G$, signals in all the blue photodetectors are accumulated to produce a strong accumulated red signal $S_R$. In addition, because all the phtodetectors are positioned in a staggering manner, the image resolution is doubled, which could not be achieved otherwise. It can be appreciated by those skilled in the art that the red, green and blue filters can be replaced by other colors and the use of the particular colors should not be considered as the limits to the present invention.

An important factor affecting the quality of an image scanner is photodetector noise that is an inherent component of the photodetector output. The corresponding figure of merit is called the signal-to-noise ratio, or S/N, in the art. The higher the S/N is, the better the related image quality will be. However, in the context of the present invention employing multiple arrays of photodetector, the final output for a scanning spot from a charge amplifier is equal to the summation of M individual photodetector outputs. Because the photodetector noise from each of the M individual photodetector elements are statistically independent, these noise components tend to be averaged down while the real image pixel signal continues to add up linearly. Therefore, the captured image by a sensor of the present invention will exhibit a higher degree of image quality than that by a sensor of the prior art. The noise reduction in the sensor of the present invention may be further explained as follows:

Assume each of the chare or electronic signal generated in an i-th photodetector in each of M arrays of photodetector is:

$$S_1, S_2, \ldots, S_M$$

and the corresponding photodetector noise from the corresponding photodetector element is $$N_1, N_2, \ldots, N_M$$

In the case of the prior art with a single column of photodetector elements, the signal-to-noise ratio is given by, say $$S/N(\text{prior art}) = S_1/N_1 \qquad (1)$$

In the case of the present invention, the final output of each pixel signal from the charge amplifier is equal to $$S_{total} = S_1 + S_2 + \ldots + S_M$$

As the photodetector noise from the i-th photodetector of each of the arrays is statistically independent, the noise at the final output from the charge amplifier is equal to:

$$N_{total}=(N_1^2+N_2^2+\ldots+N_n^2)^{1/2}$$

Therefore, in the present invention, the signal-to-noise ratio is given by $$S/N(\text{present invention})=S_{total}/N_{total}, \text{ or } S/N(\text{present invention})=(S_1+S_2+\ldots+S_n)/(N_1^2+N_2^2+\ldots+N_n^2)^{1/2} \quad (2)$$

It is seen that S/N in present invention is far greater than S/N (in prior art), hence a higher quality of image.

The present invention may be implemented as an apparatus, a system or a method, different implementation yields one or more of the following benefits or advantages. One of them is a low cost of an image sensor that provides strong scanning signals with low noise. Another one of them is the ability to provide a higher scanning throughput without requiring the increase of the illumination. Other benefits or advantages can be appreciated in the foregoing description.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

I claim:

1. An image sensor array comprising:
    a number of arrays of photodetectors and interlaced by two arrays of buffers, wherein the arrays of photodetectors are sequentially exposed to a document moving across the image sensor;
    wherein signals generated in each of the arrays of photodetectors are sequentially shifted into the two arrays of buffers;
    wherein buffered signals shifted out from the two arrays of buffers are integrated with the signals generated in each of the arrays of photodetectors to produce accumulated scanning signals of the document;
    an array of sampling circuits, each coupled to one of the photodetectors in a last array of the arrays of photodetectors, receiving respectively the accumulated signals and converting the accumulated scanning signals into sampled pixel signals; and
    a multiplexer, coupled to the array of sampling circuits, sequentially outputting the sampled pixel signals.

2. The image sensor of claim 1, wherein there are N photodetectors in each of the arrays of photodetectors, there are at least N buffers in each of the two arrays of buffers, and wherein each of the N photodetectors and two corresponding buffers respectively in the two arrays of buffers are serially connected.

3. The image sensor of claim 2, wherein a first charge signal generated in one of the N photodetectors is shifted to a first one of the two corresponding buffers.

4. The image sensor of claim 3, wherein a second charge signal generated in the one of the N photodetectors is shifted to the first one of the two corresponding buffers after the first charge signal is shifted from the first one of the two corresponding buffers to a second one of the two corresponding buffers.

5. The image sensor of claim 4, wherein a third charge signal generated in the one of the N photodetectors is accumulated over a stored charge signal originally stored in and now shifted out from one of the arrays of buffers.

6. The image sensor of claim 5, wherein the first charge signal, the second charge signal and third charge signal are respective intensity signals from three different light spectrums.

7. The image sensor of claim 6, wherein the three different light spectrums represent red, greed and blue.

8. The image sensor of claim 6, wherein the three different light spectrums are created as a result of three different illuminations.

9. The image sensor of claim 6, wherein the three different illuminations are from one or more red LEDs, green LEDs and blue LEDs, powered on independently.

10. The image sensor of claim 2, wherein each of the N buffers in each of the two arrays of buffers is a photodetector masked by a non-transparent material so that the photodetector can not be exposed to the document and is used as a temporary storage space.

11. The image sensor of claim 10, wherein a distance between a photodetector in one of the arrays of photodetectors and a corresponding buffer in one of the two arrays of buffers is determined by a scanning resolution.

12. The image sensor of claim 1, wherein the multiplexer is controlled by an array of shift registers corresponding to the last array of the arrays of photodetectors.

13. The image sensor of claim 12, wherein the number of arrays of photodetectors determines how many times faster the document moves across the image sensor if the resultant scanning signals are to have a similar signal strength as the resultant scanning signals generated from only one of the arrays of photodetectors.

14. A method for generating color images, the method comprising;
    generating N charge signals from each of M linear sensors organized in parallel, each of the M linear sensors including N photodetectors, wherein i-th photodetector in each of the M linear sensors is serially connected, $0<i\leq N$, and wherein two of every three linear sensors in the M linear sensors are shielded with a non-transparent material so that an array of non-shielded photodetectors is positioned between first two arrays of shielded photodetectors and second two arrays of shielded photodetectors;
    accumulating respectively the N charge signals over N previous charge signals shifted out from one of the first two arrays of shielded photodetectors;
    shifting the accumulated N charge signals into one of the second two arrays of shielded photodetectors;
    sampling the accumulated N charge signals in parallel to produce N sampled pixel signals; and
    subsequently multiplexing the N sampled pixel signals to an amplifier for output.

15. The method of claim 14, wherein the generating of the N charge signals happens successively for each of three colored lights before a document being scanned is advanced.

16. The method of claim 15, wherein the three colored lights are turned independently so that there are three corresponding versions of the N charge signals, one for each of the three colored lights.

17. The method of claim 16, wherein the three colored lights are red, green and blue.

18. The method of claim 15, wherein the N charge signals and the N previous charge signal are for the each of three colored lights.

19. The method of claim 14, wherein the accumulating respectively of the N charge signals over the N previous charge signals shifted out from one of the first two arrays of shielded photodetectors have substantially identical magnitude and reflect from a same scanning position of a document.

20. The method of claim 19, wherein the accumulated N charge signals are as twice strong as the N charge signals.

21. The method of claim 14, wherein the M linear sensors are integrated on a single substrate.

* * * * *